(12) United States Patent
Newstadt et al.

(10) Patent No.: US 8,453,222 B1
(45) Date of Patent: May 28, 2013

(54) POSSESSION OF SYNCHRONIZED DATA AS AUTHENTICATION FACTOR IN ONLINE SERVICES

(75) Inventors: Keith Newstadt, Newton, MA (US); Pieter Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 248 days.

(21) Appl. No.: 12/860,608

(22) Filed: Aug. 20, 2010

(51) Int. Cl.
*H04L 29/06* (2006.01)

(52) U.S. Cl.
USPC .......................................... 726/7; 726/4; 726/5

(58) Field of Classification Search
None
See application file for complete search history.

(56) References Cited

U.S. PATENT DOCUMENTS

| | | | |
|---|---|---|---|
| 6,360,322 B1 * | 3/2002 | Grawrock | 713/176 |
| 6,609,198 B1 * | 8/2003 | Wood et al. | 713/155 |
| 7,676,829 B1 * | 3/2010 | Gui et al. | 726/5 |
| 8,312,097 B1 * | 11/2012 | Siegel et al. | 709/207 |
| 2002/0062452 A1 * | 5/2002 | Ford | 713/201 |
| 2006/0070125 A1 * | 3/2006 | Pritchard et al. | 726/18 |
| 2007/0192829 A1 * | 8/2007 | Ford | 726/2 |
| 2008/0028453 A1 * | 1/2008 | Nguyen et al. | 726/9 |
| 2009/0199264 A1 * | 8/2009 | Lang | 726/1 |
| 2009/0300744 A1 * | 12/2009 | Guo et al. | 726/7 |
| 2010/0153707 A1 * | 6/2010 | Lentz, II | 713/155 |
| 2010/0318806 A1 * | 12/2010 | Hardt | 713/176 |
| 2011/0247055 A1 * | 10/2011 | Guo et al. | 726/4 |

* cited by examiner

*Primary Examiner* — Nathan Flynn
*Assistant Examiner* — Michael R Vaughan
(74) *Attorney, Agent, or Firm* — Fenwick & West LLP

(57) ABSTRACT

A user's possession of synchronized data is used as an authentication factor. When the user requests an authentication configuration change, an authentication server requests the user to prove possession of synchronized data for that user. The user launches an authentication module on a client device hosting a local copy of the synchronized data. The authentication module creates a hash of the local copy and transmits the hash to the authorization server. Upon successfully verifying the received hash using a server copy of the synchronized data, the authentication server considers the user authorized and thus allows the user to make the authorization configuration change.

20 Claims, 4 Drawing Sheets

POSSESSION OF SYNCHRONIZED DATA AS AUTHENTICATION FACTOR IN ONLINE SERVICES

BACKGROUND

1. Field of Disclosure

The disclosure generally relates to the field of computer security, in particular to user authentication.

2. Description of the Related Art

Online services often require users to authenticate themselves before availing services/information to the users. To satisfy the authentication requirement, a user typically provides the online services with confidential user information such as a password associated with the user's account. Such confidential user information often become lost (e.g., forgotten by the rightful user, stolen by an unauthorized user), and as a result making it necessary for the user to change the confidential user information.

Conventionally, when a user initiates the password reset process, the online service typically requests the user to provide secondary confidential user information, such as answers to challenging questions. Once such request for secondary confidential user information is satisfied, the online service typically emails a temporary password to the user's personal email account registered at the online service. The user can then use the temporary password for authentication, and change the password accordingly. Most users use free or low cost email systems for their personal emails. The security for these email systems has been proven to be weak. For example, there have been numerous real-world instances of major online email service providers leaking customer email information to unauthorized hackers. Accordingly, there is a need for new techniques for resetting passwords for online services without using email.

SUMMARY

Embodiments of the present disclosure include methods (and corresponding systems and non-transitory computer-readable storage media) for authenticating a user based on the user's possession of synchronized data.

One aspect of the present disclosure is a computer-implemented method for user authentication, comprising: storing on a non-transitory computer-readable storage medium a piece of data received from a client device associated with a user; receiving a request for authenticating the user; receiving from the client device an attribute of the piece of data; responsive to receiving the request, verifying the received attribute based on the stored piece of data; and responsive to successfully verifying the received attribute, determining that the user is successfully authenticated.

Another aspect of the present disclosure is a computer-implemented method for user authentication, comprising: transmitting to an authentication server a piece of data retrieved from a non-transitory computer-readable storage medium in a client device associated with a user; applying a cryptographic hash function to the piece of data to generate a hash value; and transmitting to the authentication server a request to change a security configuration setting for the user along with the hash value.

Still another aspect of the present disclosure is a computer system for user authentication, comprising: a non-transitory computer-readable storage medium storing executable computer program code, the computer program code comprising program code for: storing a piece of data received from a client device associated with a user; receiving a request for authenticating the user; receiving from the client device an attribute of the piece of data; responsive to receiving the request, verifying the received attribute based on the stored piece of data; and responsive to successfully verifying the received attribute, determining that the user is successfully authenticated.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
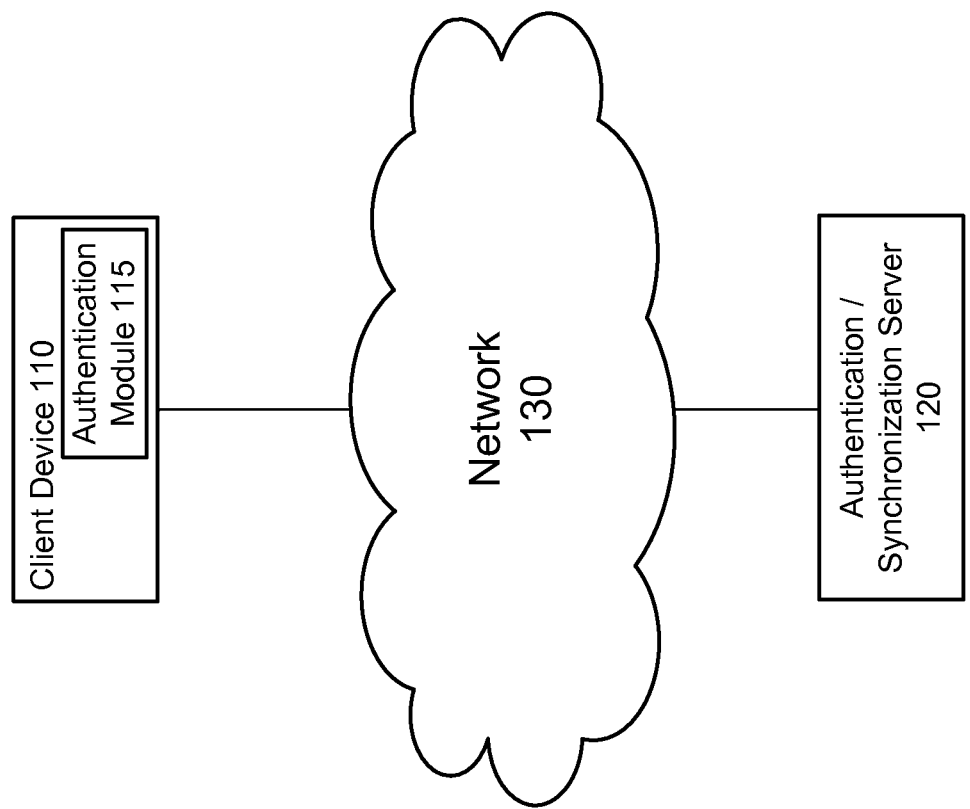
FIG. 1 is a high-level block diagram of a computing environment according to one embodiment of the present disclosure.

FIG. 1 is a high-level block diagram that illustrates a computing environment 100 for authenticating a user based on the user's possession of synchronized data, according to one embodiment of the present disclosure. As shown, the computing environment 100 includes a client device 110 and an authentication/synchronization server 120 connected through the Internet 130. Only one of each entity is illustrated in order to simplify and clarify the present description. There can be other entities in the computing environment 100 as well.

The authentication/synchronization server 120 is a hardware device and/or software program configured to provide authentication and data synchronization services to users. In order to use the services provided by the authentication/synchronization server 120, a user first establishes an account with the authentication/synchronization server 120 (or an affiliated server) through a registration process. During the registration process, the user provides user information such as name and email address(es), and registers one or more computing devices hosting data for synchronization by providing device information such as the Media Access Control (MAC) addresses.

In order to synchronize a piece of data hosted on a registered device, the authentication/synchronization server 120 receives the data from the device and stores one or more copies of the data in one or more data storage devices. The copy of the data residing on the registered device is referred to as the "local copy" of the synchronized data. The copies of the data made by the authentication/synchronization server 120 are collectively called the "server copy" of the synchronized data. In one embodiment, the authentication/synchronization server 120 periodically communicates with the registered device to ensure that the server copy is in-sync with the local copy.

In order to authenticate a user, the authentication/synchronization server 120 requires one or more authentication factors for the user. An authentication factor is a piece of information that can be used to verify a user's identity, such as something the user know (e.g., a password), something the user has (e.g., a mobile phone), or something the user is (e.g., a biometric identifier). One example authentication factor is a username-password pair the user established during the registration process. Another example authentication factor is the user's possession of synchronized data. It is reasonable to assume that a user would have possession of the devices registered under the user's account along with the synchronized data resided thereon, and that others would not have such possession. Thus, the authentication/synchronization server 120 can authenticate a user based on whether the user can establish that he/she has possession of the local copy of the synchronized data associated with the user.

In one embodiment, one or more of the functions of the authentication/synchronization server 120 is provided by a cloud computing environment. As used herein, cloud computing refers to a style of computing in which dynamically scalable and often virtualized resources are provided as a service over the Internet 130.

A client device 110 is an electronic device for a user to communicate with the authentication/synchronization server 120. In one embodiment, the client device 110 is a conventional computer system executing, for example, a Microsoft Windows-compatible operating system (OS), Apple OS X, and/or a Linux distribution. In another embodiment, the client device 110 is another device having computer functionality, such as a personal digital assistant (PDA), mobile telephone, video game system, etc. The client device 110 may store data in and retrieve data from a local storage medium (e.g., a hard drive, a solid-state memory device). To enhance security, the client device 110 may have a security mechanism (e.g., pass code, biometrics) in place that requires authentication before usage. Accordingly, the security mechanism ensures that only a rightful user has access to applications and data stored on the client device 110.

For purposes such as disaster recovery and convenience, the user may register the client device 110 with the authentication/synchronization server 120 and synchronize locally stored data with the authentication/synchronization server 120. The user may later prove authentication to the authentication/synchronization server 120 by establishing that he/she has possession of the local copy of the synchronized data. The client device 110 executes an authentication module 115 for synchronizing local data and/or establishing possession of the local copy of the synchronized data. The authentication module 115, upon the user's request, transmits to the authentication/synchronization server 120 information associated with the local copy (e.g., a hash value of the local copy) that the authentication/synchronization server 120 can verify using the server copy. In one embodiment, the authentication module 115 is provided by the entity that operates the authentication/synchronization server 120.

The Internet 130 is a system of interconnected computer networks that use standard communications technologies and/or protocols to facilitate data transmission among the computer networks. Thus, the Internet 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the Internet 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the Internet 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Computer Architecture

Figure 2:
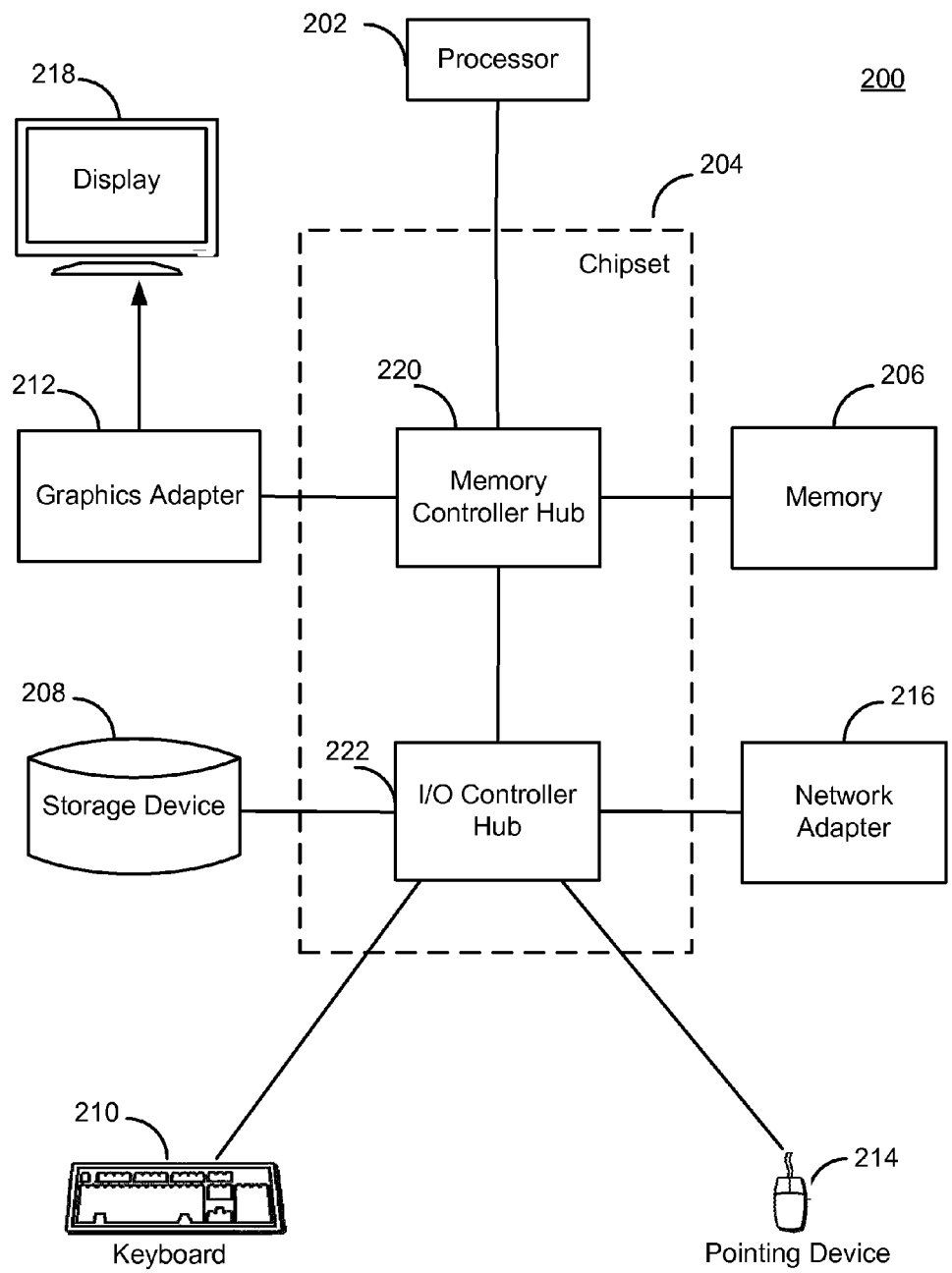
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the authentication/synchronization server 120 might comprise multiple blade servers working together to provide the functionality described herein. As another example, the client device 110 might comprise a mobile telephone with limited processing power. The computers 200 can lack some of the components described above, such as keyboards 210, graphics adapters 212, and displays 218.

Example Architectural Overview of Authentication Module

Figure 3:
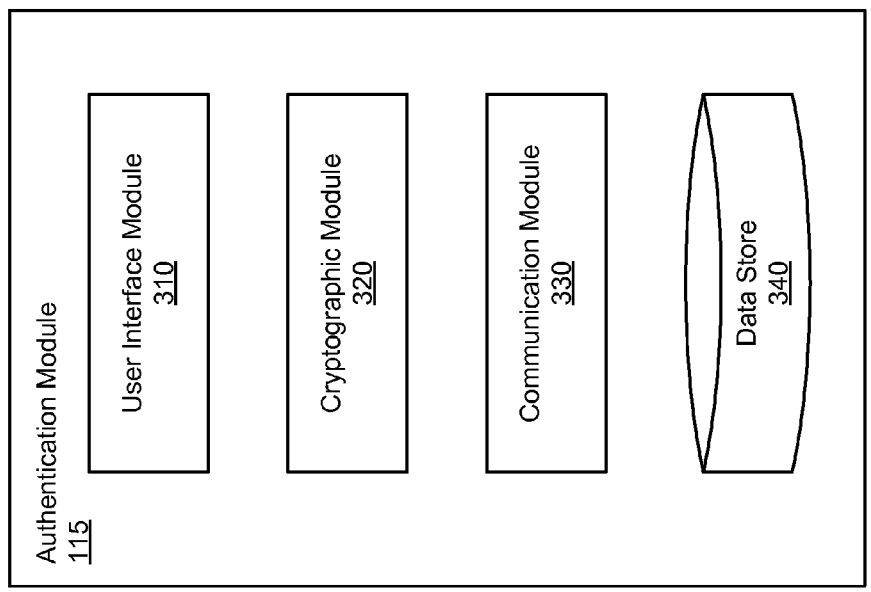
FIG. 3 is a high-level block diagram illustrating modules within an authentication module according to one embodiment of the present disclosure.

FIG. 3 is a high-level block diagram illustrating a detailed view of modules within the authentication module 115 according to one embodiment. Some embodiments of the authentication module 115 have different and/or other modules than the ones described herein. Similarly, the functions can be distributed among the modules in accordance with other embodiments in a different manner than is described here. As illustrated, the authentication module 115 includes a User Interface ("UI") module 310, a cryptographic module 320, a communication module 330, and a data store 340.

The UI module 310 provides a graphical user interface for the user to initiate and conduct activities such as managing data synchronization (e.g., specifying what data is subject to synchronization), changing authentication configuration settings (e.g., resetting password), and establishing that the user has possession of the local copy of the synchronized data. The UI module 310 displays the graphical user interface on a screen of the client device 110 and receives user instructions from components such as a touch screen and a keypad.

The cryptographic module 320 generates one or more hash values of the local copy of the synchronized data. In order for the authentication module 115 to establish to the authentication/synchronization server 120 that the user has possession of the local copy of the synchronized data, it is necessary for the authentication module 115 to transmit to the authentication/synchronization server 120 a verifiable attribute of the local copy. One example of the verifiable attribute is a hash value of the local copy. The cryptographic module 320 applies a cryptographic hash function to the local copy of a piece of synchronized data to generate a hash value for that piece of synchronized data. The cryptographic hash function is provided by the authentication/synchronization server 120 (e.g., preinstalled in the authentication module 115).

The communication module 330 communicates with the authentication/synchronization server 120 according to the activities specified by the user to the UI module 310. For example, the communication module 330 transmits the data to be synchronized to the authentication/synchronization server 120, and periodically communicates with the authentication/synchronization server 120 to ensure that the local copy and the server copy are in-sync. The communication module 330 also transmits the hash value to the authentication/synchronization server 120 to establish possession. In one embodiment, along with the hash value, the communication module 330 also transmits to the authentication/synchronization server 120 information identifying the user, the client device 110, and/or the piece of synchronized data associated with the hash value. If the user instructs the UI module 310 to change an authentication configuration setting, the communication module 330 first transmits a corresponding request (e.g., a password reset request) to the authentication/synchronization server 120 along with the hash value, and once the user is authenticated using the hash value, the communication module 330 communicates with the authentication/synchronization server 120 to make the authentication configuration setting change.

The data store 340 stores data used by the authentication module 115. Examples of such data include information about the local copy (e.g., storage location), and information about the authentication/synchronization server 120 (e.g., IP address), to name a few. The data store 340 may be a relational database or any other type of database that stores the data, such as a flat file.

Example Architectural Overview of Authentication/Synchronization Server

Figure 4:
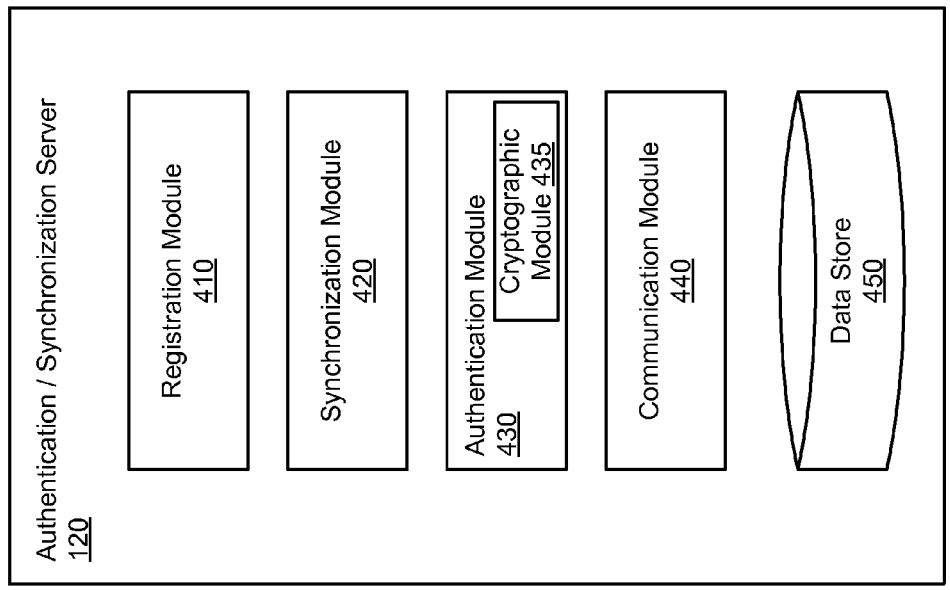
FIG. 4 is a high-level block diagram illustrating modules within an authentication/synchronization server according to one embodiment of the present disclosure.

FIG. 4 is a high-level block diagram illustrating a detailed view of modules within the authentication/synchronization server 120 according to one embodiment. Some embodiments of the authentication/synchronization server 120 have different and/or other modules than the ones described herein. Similarly, the functions can be distributed among the modules in accordance with other embodiments in a different manner than is described here. As illustrated, the authentication/synchronization server 120 includes a registration module 410, a synchronization module 420, an authentication module 430, a communication module 440, and a data store 450.

The registration module 410 provides a registration process to new users for establishing user accounts. In one embodiment, the registration module 410 hosts one or more web pages for the users to interact with to provide user information, register client devices, and/or specify data for synchronization. Information about the user, the registered devices, and data synchronization are stored in the user's account profile. The registration module 410 also enables existing users to manage their account profiles and make changes to aspects such as authentication configuration settings.

The synchronization module 420 synchronizes data residing on users' client devices 110 based on the user specifications. The synchronization module 420 communicates with a client device 110 (or the authentication module 115 residing thereon) to receive the data to be synchronized, and stores one or more copies of the received data in one or more data storage devices. The synchronization module 420 may also periodically communicate with the client device 110 to ensure that the server copy is in-sync with the local copy.

The authentication module 430 authenticates users by verifying authentication factors provided by the user. In one embodiment, the authentication module 430 supports multiple authentication mechanisms using different authentication factors such as a username-password pair, and an establishment of possession of the local copy of the synchronized data. In order to authenticate a user based on a received username-password pair, the authentication module 430 retrieves the user's account profile identified by the username, matches the password with the password in the user's account profile, and authenticates the user if the two passwords match. In order to authenticate a user based on an establishment of possession of the synchronized data, the authentication module 430 receives one or more verifiable attributes (e.g., hash values) of the local copy of the synchronized data from the authentication module 115, and verifies the received attributes using the corresponding server copy of the synchronized data.

As shown, the authentication module 430 includes a cryptographic module 435. The cryptographic module 435 verifies a received hash value by retrieving the corresponding server copy of the piece of synchronized data (e.g., based on the accompanying information identifying the piece of synchronized data), applying a cryptographic hash function (same as the hash function applied by the cryptographic module 320) to the server copy, and comparing the resulting hash value with the received hash value. If the two hash values match, the authentication module 430 considers that the received hash value is successfully validated and that the user has successfully established possession of the local copy of the piece of synchronized data, and authenticates the user accordingly.

The authentication module 430 may support multiple levels of authentication. For example, some critical configuration operations, due to their sensitive nature, may be subject to a higher level of authentication than is typically required. Examples of such critical configuration operations include changing/resetting password, challenge questions, security token information, email address, mobile phone number, etc. In order for a user to be authenticated to a higher level, the authentication module 430 may require the user to provide a combination of authentication factors, and/or increase the threshold value for one or more authentication factors. For example, the authentication module 430 may require that the user establish possession of synchronized data residing on multiple registered client devices 110 and/or that a high percentage (or number) of the provided hash values be successfully verified. On the other hand, if the required authentication level is low, the user is only required to provide one or more hash values of synchronized data residing on a single client device 110, and/or the threshold value for the successful verification for the provided hash values is low. In one embodiment, if the successful verification rate for the provided hash values is below the necessary threshold value, the authentication module 430 allows the user to provide additional hash values (e.g., from additional client devices 110) in order to reach the required threshold percentage.

The communication module 440 communicates with the client device 110 to provide the authentication and data synchronization services to users. For example, the communication module 440 receives the data to be synchronized from the client device 110 and periodically communicates with the client device 110 to ensure that the local copy and the server copy are in-sync. As another example, the communication module 440 receives user requests (e.g., password reset requests) and authentication factors accompanying the requests, and transmits the authentication results in return.

The data store 450 stores data used by the authentication/synchronization server 120. Examples of such data include the users' account profiles, and the server copy of the synchronized data, to name a few. The data store 450 may be a relational database or any other type of database.

Overview of Methodology

Figure 5:
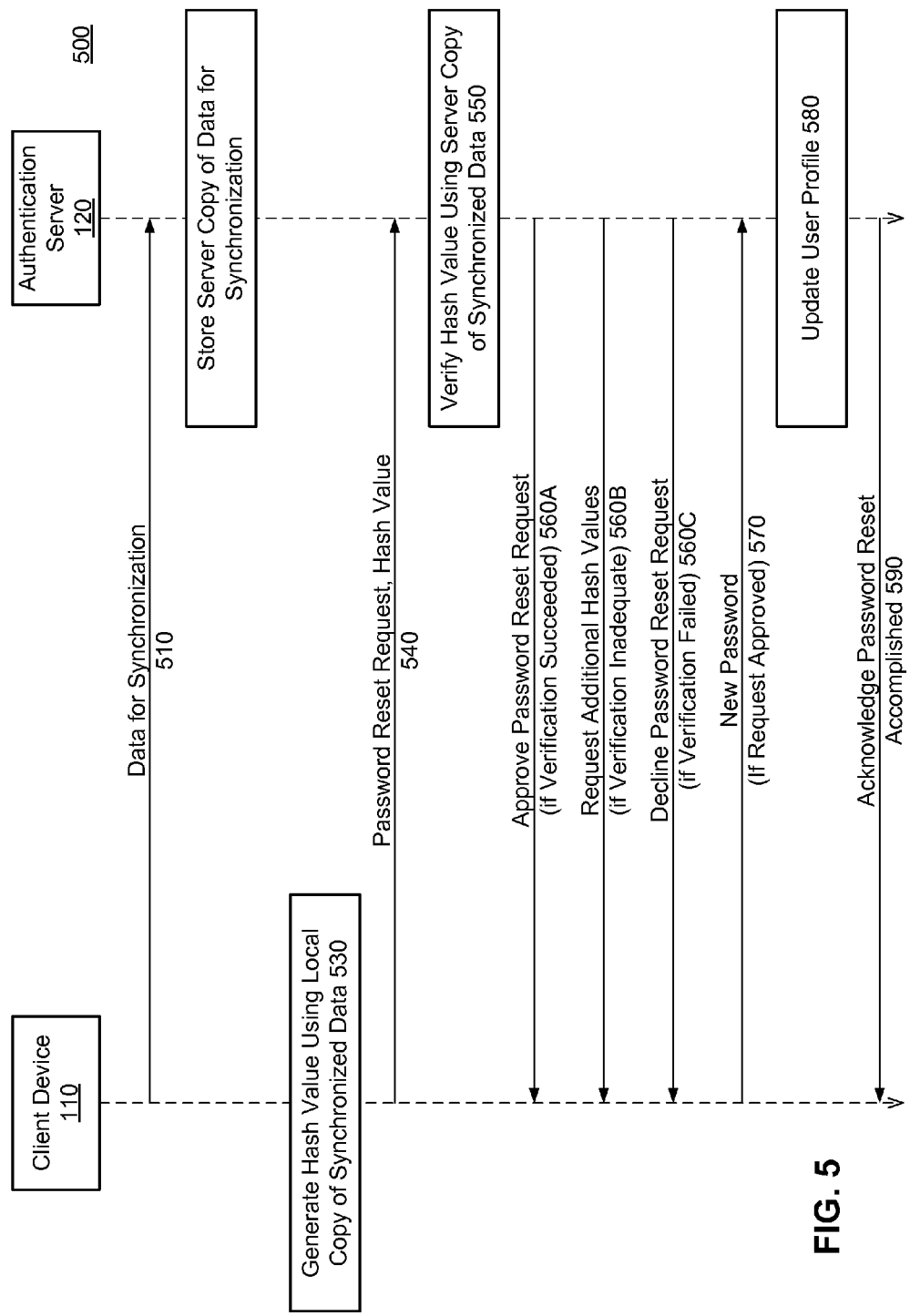
FIG. 5 is a flow diagram illustrating a process for authenticating a user based on the user's possession of synchronized data according to one embodiment of the present disclosure.

FIG. 5 is a ladder diagram illustrating a process 500 for the authentication/synchronization server 120 to authenticate a user based on the user's possession of synchronized data and reset the user's password upon successful authentication, according to one embodiment. Other embodiments can include different and/or additional steps than the ones described herein.

The client device 110 transmits 510 to the authentication/synchronization server 120 data for synchronization. The authentication/synchronization server 120 receives and stores 520 the data for synchronization (the server copy). Subsequently, the user of the client device 110 forgot his/her password and instructed the client device 110 to initiate a password reset process. As a result, the client device 110 generates 530 one or more hash values of the local copy of the synchronized data, and transmits 540 to the authentication/synchronization server 120 the hash values along with a request to reset the password.

In response to receiving the password reset request, the authentication/synchronization server 120 authenticates the user to the level necessary to reset the user's password. The authentication/synchronization server 120 verifies 550 the received hash values using the corresponding server copy of the synchronized data. If an adequate amount (or percentage) of the received hash values match the hash values generated using the server copy of the corresponding synchronized data, the authentication/synchronization server 120 considers the authentication successful and transmits 560A an approval for the password reset request. If the amount (or percentage) of matching hash values is below a predetermined threshold value for the necessary authentication level, the authentication/synchronization server 120 requests 560B additional hash values from the client device 110 (or another device hosting synchronized data for that user). If the authentication/synchronization server 120 cannot authenticate the user within a predetermined period of time, the authentication/synchronization server 120 considers the authentication unsuccessful, and transmits 560C to the client device 110 a rejection for the password reset request.

If the password reset request is approved, the client device 110 transmits 570 to the authentication/synchronization server 120 a new password specified by the user to replace the old password. The authentication/synchronization server 120 updates 580 the user's account profile to reflect the password change, and transmits 590 to the client device 110 an acknowledgement indicating that the password reset is accomplished.

It is not necessary for the user to make the password reset request using a registered client device 110. The user can make the request through any computing device. In response, the authentication/synchronization server 120 requests the user to establish possession of the synchronized data, which the user can accomplish by interacting with the authentication module 115 in one or more of the registered devices.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for authenticating a user based on the user's possession of synchronized data. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method for user authentication, comprising:
   storing on a non-transitory computer-readable storage medium server data synchronized with client data on one or more client devices associated with a user;
   receiving an authentication request for authenticating the user;
   identifying a level of authentication associated with the authentication request from a plurality of levels of authentication;
   transmitting a data request to the one or more client devices, the data request requesting attributes of the client data, the requested attributes of the client data determined responsive to the level of authentication associated with the authentication request;
   receiving from the one or more client devices the requested attributes of the client data;
   verifying the received attributes of the client data based on the stored server data to determine whether the received attributes meet the level of authentication associated with the authentication request;
   responsive to the received attributes meeting the level of authentication associated with the authentication request, determining that the user is successfully authenticated; and
   responsive to the received attributes not meeting the level of authentication associated with the authentication request, requesting additional attributes of the client data for verification.

2. The computer-implemented method of claim 1, wherein the requested attributes comprise hash values of the client data, and wherein verifying the received attributes comprises applying a cryptographic hash function to the stored server data.

3. The computer-implemented method of claim 1, further comprising:
   responsive to unsuccessfully verifying the received attributes, determining that the user is unsuccessfully authenticated.

4. The computer-implemented method of claim 1, wherein the authentication request comprises a request to change a security configuration setting, and wherein the method further comprises:
   responsive to successfully authenticating the user, enabling the user to change the security configuration setting.

5. The computer-implemented method of claim 4, wherein enabling the user to change the security configuration setting comprises allowing the user to reset a password for the user.

6. The computer-implemented method of claim 1, further comprising:
   periodically communicating with the one or more client devices to synchronize the server data and the client data.

7. The computer-implemented method of claim 1, wherein different authentication levels are associated with different threshold values describing different amounts of attributes of the client data to verify in order to successfully meet the levels of authentication, wherein verifying the received attributes comprises:
   determining a threshold value associated with the identified authentication level; and
   determining whether an amount of received attributes that verify based on the stored server data meet the threshold value associated with the identified authentication level.

8. The computer-implemented method of claim 1, wherein the identified level of authentication associated with the authentication request requires attributes of client data from a plurality of client devices and wherein transmitting the data request comprises transmitting the data request to the plurality of client devices.

9. A computer-implemented method for user authentication, comprising:
   transmitting to an authentication server first client data retrieved from a non-transitory computer-readable storage medium in a client device associated with a user, the authentication server configured to store server data synchronized with client data received from one or more client devices associated with the user;
   transmitting to the authentication server an authentication request for authenticating the user, the authentication server configured to identify a level of authentication associated with the authentication request from a plurality of levels of authentication and to transmit a data request to the one or more client devices associated with the user, the data request requesting attributes of the client data, the requested attributes of the client data determined responsive to the level of authentication associated with the authentication request;
   responsive to receiving the data request, applying a cryptographic hash function to the first client data to generate a hash value; and
   transmitting the generated hash value to the authentication server, the authentication server configured to:
      verify the generated hash value and any other attributes of client data received from other client devices to determine whether the received attributes meet the level of authentication associated with the authentication request;
      responsive to the received attributes meeting the level of authentication associated with the authentication request, determine that the user is successfully authenticated; and
      responsive to the received attributes not meeting the level of authentication associated with the authentication request, requesting additional attributes of the client data for verification.

10. The computer-implemented method of claim 9, further comprising:
periodically communicating with the authentication server to synchronize the first client data and the server data.

11. The computer-implemented method of claim 9, wherein different authentication levels are associated with different threshold values describing different amounts of attributes of the client data to verify in order to successfully meet the levels of authentication, wherein verifying the received attributes comprises:
determining a threshold value associated with the identified authentication level; and
determining whether an amount of received attributes that verify based on the stored server data meet the threshold value associated with the identified authentication level.

12. The computer-implemented method of claim 9, wherein the identified level of authentication associated with the authentication request requires attributes of client data from a plurality of client devices and wherein transmitting the data request comprises transmitting the data request to the plurality of client devices.

13. A computer system for user authentication, comprising:
a non-transitory computer-readable storage medium storing executable computer program code, the computer program code comprising program code for:
storing server data synchronized with client data on one or more client devices associated with a user;
receiving an authentication request for authenticating the user;
identifying a level of authentication associated with the authentication request from a plurality of levels of authentication;
transmitting a data request to the one or more client devices, the data request requesting attributes of the client data, the requested attributes of the client data determined responsive to the level of authentication associated with the authentication request;
receiving from the one or more client devices the requested attributes of the client data;
verifying the received attributes of the client data based on the stored server data to determine whether the received attributes meet the level of authentication associated with the authentication request;
responsive to the received attributes meeting the level of authentication associated with the authentication request, determining that the user is successfully authenticated; and
responsive to the received attributes not meeting the level of authentication associated with the authentication request, requesting additional attributes of the client data for verification.

14. The computer system of claim 13, wherein the requested attributes comprise hash values of the client data, and wherein verifying the received attributes comprises applying a cryptographic hash function to the stored server data.

15. The computer system of claim 13, wherein the computer program code further comprises program code for:
responsive to unsuccessfully verifying the received attributes, determining that the user is unsuccessfully authenticated.

16. The computer system of claim 13, wherein the authentication request comprises a request to change a security configuration setting, and wherein the computer program code further comprises program code for:
responsive to successfully authenticating the user, enabling the user to change the security configuration setting.

17. The computer system of claim 16, wherein enabling the user to change the security configuration setting comprises allowing the user to reset a password for the user.

18. The computer system of claim 13, wherein the computer program code further comprises program code for:
periodically communicating with the one or more client devices to synchronize the server data and the client data.

19. The computer system of claim 13, wherein different authentication levels are associated with different threshold values describing different amounts of attributes of the client data to verify in order to successfully meet the levels of authentication, wherein verifying the received attributes comprises:
determining a threshold value associated with the identified authentication level; and
determining whether an amount of received attributes that verify based on the stored server data meet the threshold value associated with the identified authentication level.

20. The computer system of claim 13, wherein the identified level of authentication associated with the authentication request requires attributes of client data from a plurality of client devices and wherein transmitting the data request comprises transmitting the data request to the plurality of client devices.

* * * * *